United States Patent
Owng et al.

(10) Patent No.: US 8,198,765 B2
(45) Date of Patent: Jun. 12, 2012

(54) MOTOR ASSEMBLY WITH A THERMALLY CONDUCTIVE BRIDGING MEMBER

(75) Inventors: Rong-Jong Owng, Nantou (TW); Chia-Wen Ruan, Nantou (TW); Yi-Tang Wei, Nantou (TW); Ming-Chen Liao, Nantou (TW)

(73) Assignees: Chia-Wen Ruan (TW); Joy Ride Tech. Co., Ltd. (TW)

( * ) Notice: Subject to any disclaimer, the term of this patent is extended or adjusted under 35 U.S.C. 154(b) by 190 days.

(21) Appl. No.: 12/844,799

(22) Filed: Jul. 27, 2010

(65) Prior Publication Data

US 2011/0025147 A1   Feb. 3, 2011

(30) Foreign Application Priority Data

Jul. 29, 2009 (TW) .............................. 98125537 A
May 24, 2010 (TW) .............................. 99116517 A

(51) Int. Cl.
*H02K 1/32* (2006.01)
(52) U.S. Cl. ........................................... 310/64; 310/89
(58) Field of Classification Search .................... 310/43, 310/64, 89, 254.1, 261.1
See application file for complete search history.

(56) References Cited

U.S. PATENT DOCUMENTS

| | | | | |
|---|---|---|---|---|
| 4,823,032 A | * | 4/1989 | Ward et al. | 310/43 |
| 6,020,661 A | * | 2/2000 | Trago et al. | 310/43 |
| 6,201,321 B1 | * | 3/2001 | Mosciatti et al. | 310/43 |
| 6,222,289 B1 | * | 4/2001 | Adames | 310/54 |
| 6,355,996 B1 | * | 3/2002 | Birkestrand | 310/54 |
| 6,583,532 B2 | * | 6/2003 | Hein et al. | 310/260 |
| 6,657,331 B2 | * | 12/2003 | Asao et al. | 310/54 |
| 7,042,124 B2 | * | 5/2006 | Puterbaugh et al. | 310/89 |
| 7,550,882 B2 | * | 6/2009 | Verhaegen | 310/58 |

* cited by examiner

*Primary Examiner* — Thanh Lam
(74) *Attorney, Agent, or Firm* — The Mueller Law Office, P.C.

(57) ABSTRACT

A motor assembly includes a housing, a revolving shaft revolvably mounted in the housing, a magnet mounting portion surrounding and rotatable with the revolving shaft, a magnet disposed on the magnet mounting portion, a magnetically inducible core having a plurality of stator poles spaced apart from rotor magnetic poles of the magnet, and a plurality of stator windings wound on the stator poles, respectively. The stator windings are spaced apart from end walls of the housing by axial intervals. A thermally conductive bridging member is disposed to span the axial intervals to conduct heat emanating from the stator windings to the end walls so as to dissipate heat out of the housing.

11 Claims, 11 Drawing Sheets

US 8,198,765 B2

MOTOR ASSEMBLY WITH A THERMALLY CONDUCTIVE BRIDGING MEMBER

CROSS-REFERENCE TO RELATED APPLICATION

This application claims priority of Taiwanese Patent Application No. 098125537, filed on Jul. 29, 2009, and Taiwanese Patent Application No. 099116517, filed on May 24, 2010, the disclosures of which are herein incorporated by reference.

BACKGROUND OF THE INVENTION

1. Field of the Invention

This invention relates to a brushless motor assembly, more particularly to a motor assembly with a thermally conductive bridging member.

2. Description of the Related Art

In each of Taiwanese Utility Model Nos. M331251, M322677, and M300395, and Taiwanese Patent No. I250718, a motor assembly is disclosed, which includes a fan driven by a drive shaft to accelerate air flow in the motor housing so as to facilitate heat dissipation. However, since the path of air flow generated as a result of rotation of the fan passes through the interior of the motor housing, dust may be directed into the motor and may accumulate on the rotor, thereby adversely affecting running of the rotor and heat dissipation, which may in turn result in damage to the components within the motor housing.

SUMMARY OF THE INVENTION

An object of the present invention is to provide a motor assembly which can prevent entry of dust while ensuring good heat-dissipating efficiency.

According to this invention, the motor assembly includes a housing having a housing wall defining an accommodation chamber therein, and first and second end walls extending radially to close the accommodation chamber. A rotor subassembly includes a revolving shaft supported on the first and second end walls to be revolvable about the axis, a magnet mounting portion disposed in the accommodation chamber to surround and to be rotatable with the revolving shaft, and a magnet disposed on the magnet mounting portion and having a plurality of rotor magnetic poles. A stator subassembly includes a magnetically inducible core disposed in the accommodation chamber, and having a plurality of stator poles which confront and which are spaced apart from the rotor magnetic poles, and a plurality of stator windings wound on the stator poles, respectively. When the stator windings are fed with electricity, the magnet mounting portion is induced to rotate together with the revolving shaft. Each of the stator windings has first and second end-wall-side regions which are respectively spaced apart from the first and second end walls by first and second axial intervals, respectively. A thermally conductive bridging member is disposed to span at least one of the first and second axial intervals to conduct heat emanating from the stator windings to the first and second end walls so as to dissipate heat out of the accommodation chamber.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
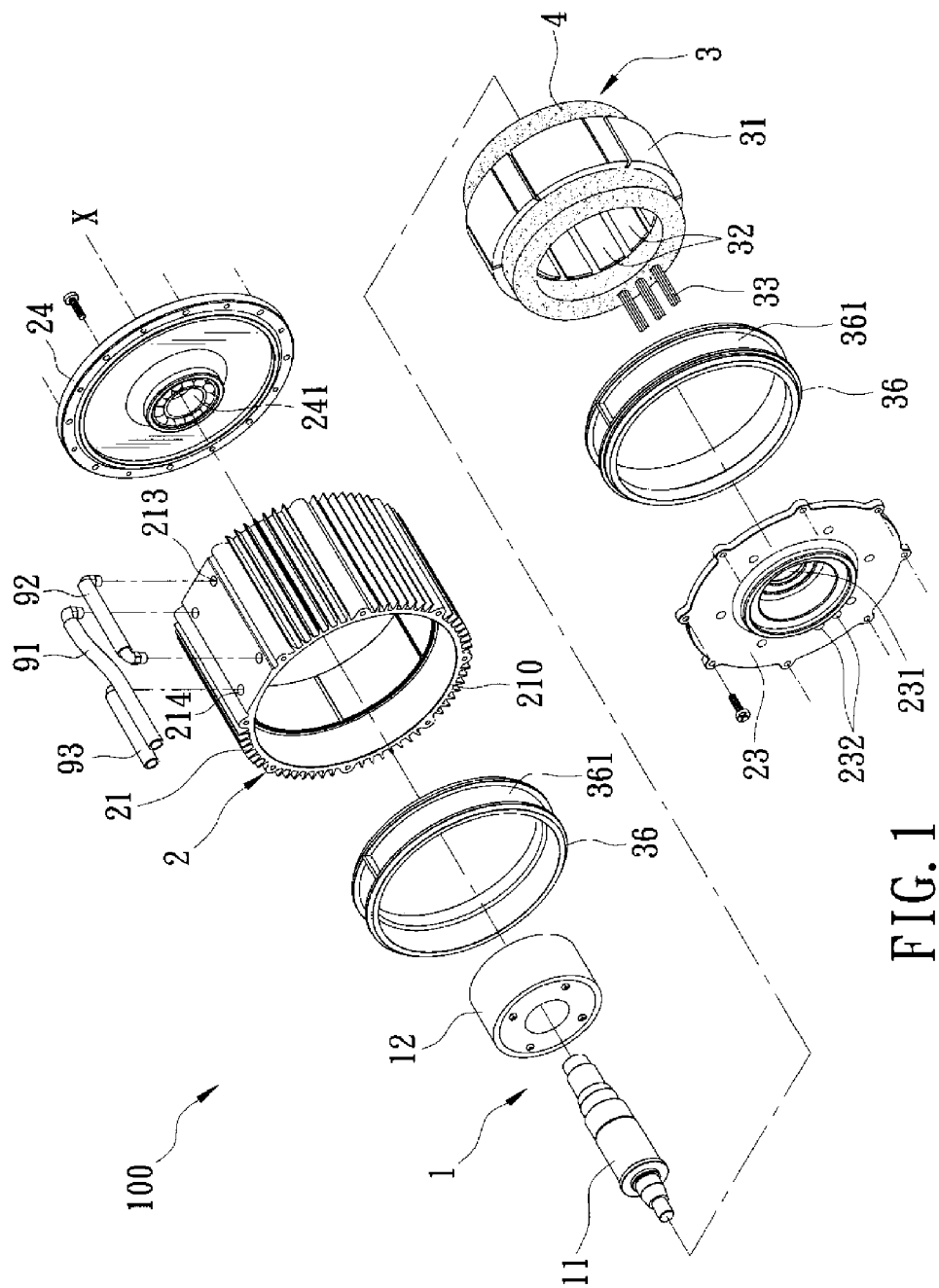
FIG. 1 is an exploded perspective view of the first preferred embodiment of a motor assembly according to this invention.

Before the present invention is described in greater detail, it should be noted that same reference numerals have been used to denote like elements throughout the specification.

Figure 2:
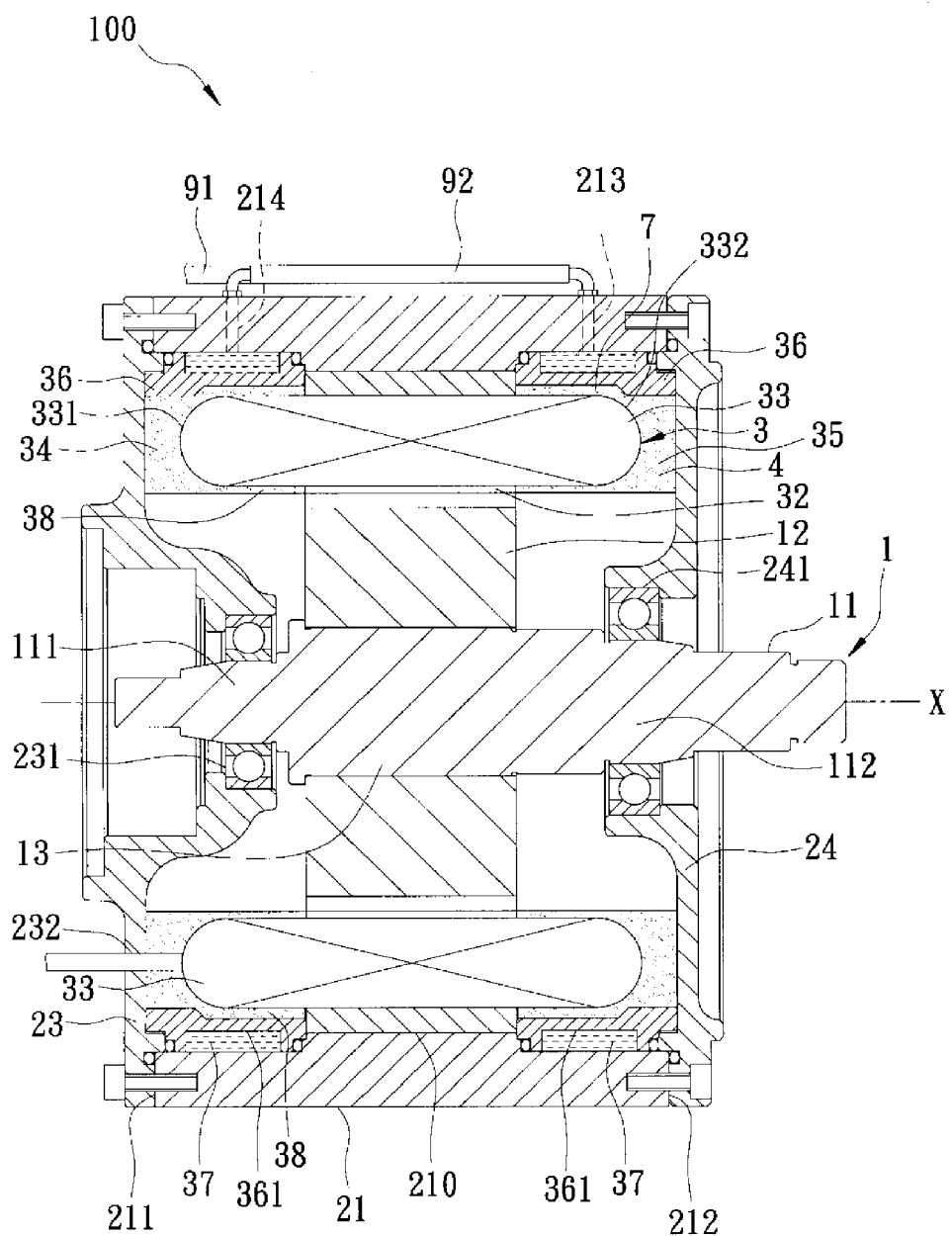
FIG. 2 is a sectional view of the first preferred embodiment.
Figure 3:
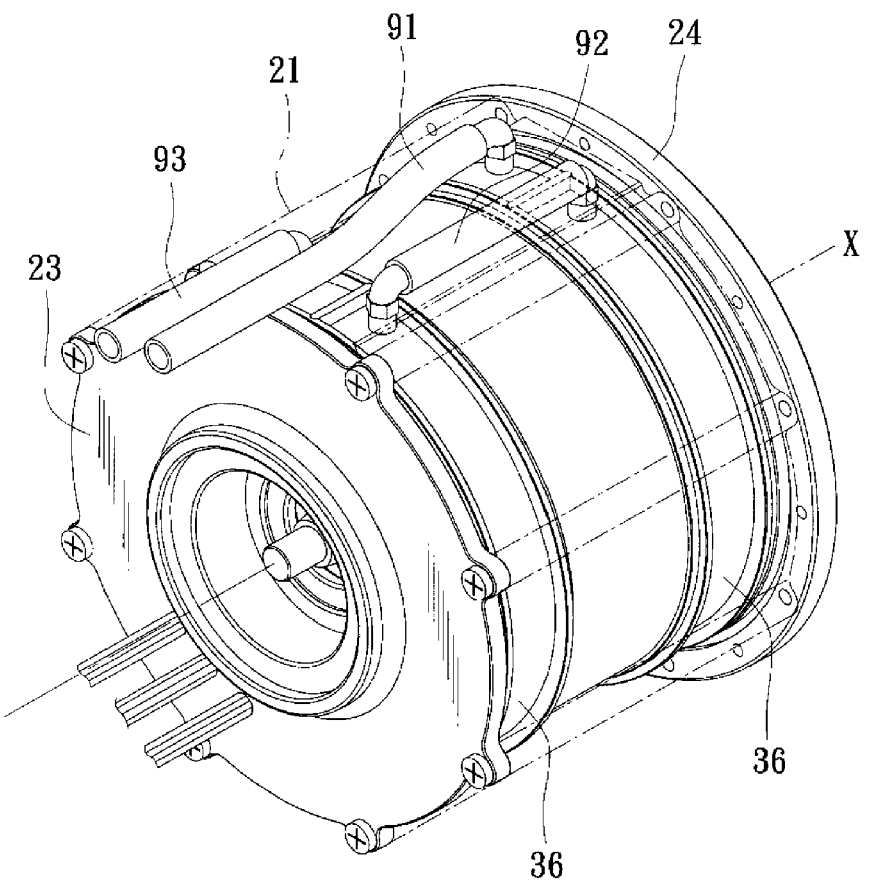
FIG. 3 is a perspective view of the first preferred embodiment.

Referring to FIGS. 1 to 3, the first preferred embodiment of a motor assembly 100 according to the present invention is an "inner-rotor-type" brushless motor, and is shown to comprise a housing 2, a rotor subassembly 1, a stator subassembly 3, and primary and secondary conductive bridging members 4.

The housing 2 is made from a metal material, and has a housing wall 21 which defines an accommodation chamber 210 therein, and which extend in an axial direction to terminate at first and second peripheral edges 211,212, and first and second end walls 23,24 extending radially from the first and second peripheral edges 211,212, respectively, toward an axis (X), so as to close the accommodation chamber 210. Each of the first and second end walls 23,24 has a bearing hole 231, 241 for accommodating a bearing member therein. The first end wall 23 further has a plurality of wire holes 232.

The rotor subassembly 1 includes a revolving shaft 11 and a magnet 12. The revolving shaft 11 has first and second shaft ends 111,112 which are supported by the bearing members, respectively, to permit the revolving shaft to be revolvable about the axis (X). A magnet mounting portion 13 is disposed in the accommodation chamber 210 to surround and to be rotatable with the revolving shaft 11 about the axis (X). In this embodiment, the magnet mounting portion 13 is integrally formed with the revolving shaft 11 between the first and second shaft ends 111,112. The magnet 12 is configured to surround the magnet mounting portion 13, and has a plurality of rotor magnetic poles oriented radially.

The stator subassembly 3 includes a magnetically inducible core 31 and a plurality of stator windings 33. The magnetically inducible core 31 is disposed in the accommodation chamber 210 and radially and outwardly of the magnet 12, and has a plurality of stator poles 32 which are angularly spaced from one another about the axis (X) by a plurality of radially extending gaps 38, and each of which confronts and is spaced apart from a corresponding one of the rotor magnetic poles in a radial direction relative to the axis (X). Each of the stator windings 33 is wound on a respective one of the stator poles 32. Hence, when the stator windings 33 are fed with electricity, the magnet mounting portion 13 as well as the revolving shaft 11 is induced to rotate about the axis (X). Each of the stator windings 33 has first and second end-wall-side regions 331,332 respectively spaced apart from the first and second end walls 23,24 by first and second axial intervals 34,35, respectively. The stator windings 33 have terminal ends respectively led through the wire holes 232 and externally of the housing 2 for connection to an electric source (not shown).

Further, the stator subassembly 3 includes first and second thermally conductive rings 36 disposed between the stator windings 33 and the housing wall 21. Each of the first and second thermally conductive rings 36 has an outer concaved surface 361 facing the housing wall 21 to cooperatively define a heat exchange conduit 37. The housing wall 21 has a coolant inlet 213 and a coolant outlet 214 in fluid communication with the heat exchange conduits 37. In this embodiment, a coolant, such as cooling water, can flow through a water pipe 91 connected to the coolant inlet 213, the coolant inlet 213, one of the heat exchange conduit 37, a communicating pipe 92 interconnecting the heat exchange conduits 37, the other one of the heat exchange conduits 37, the coolant outlet 214, and a water pipe 93 connected to the coolant outlet 214 so as to remove the heat from the accommodation chamber 210 and exteriorly of the housing 2.

The primary thermally conductive bridging member 4 is disposed to span the first and second axial intervals 34,35. The secondary thermally conductive bridging member 7 is disposed to span each of the radially extending gaps 38, and extends in the axial direction to be integrally formed with the primary thermally conductive bridging member 4. The primary and secondary thermally conductive bridging members 4,7 are made from a thermally conductive resin-based composite. Specifically, the primary and secondary thermally conductive bridging members 4,7 are made by a process which comprises the steps of (i) filling the first and second axial intervals 34,35 and the radial extending gaps 38 with a thermally conductive resin-based composition which comprises a polymeric resin matrix and a thermally conductive material that is loaded in the polymeric resin matrix and that is selected from a group consisting of silicon carbide, aluminum, boron nitride, aluminum nitride, and the mixture thereof, and (ii) curing the thermally conductive resin based composition.

The experimental data shown in Table 1 are temperatures of the stator windings 33 measured under a room temperature of 27° C. and prior to introduction of cooling water into the heat exchange conduits 37.

| time (min) | temperature of stator windings with thermally conductive bridging members* | temperature of stator windings without thermally conductive bridging members |
| --- | --- | --- |
| 1 | 32.4 | 34.1 |
| 2 | 40.6 | 55 |
| 3 | 46.8 | 65 |
| 4 | 51.2 | 72 |
| 5 | 55 | 78 |
| 6 | 58.8 | 84 |
| 7 | 62.1 | 92 |
| 8 | 65.6 | 95 |
| 9 | 68.2 | 98.6 |
| 10 | 70.9 | 102.4 |
| 11 | 73.5 | 104 |
| 12 | 76.1 | 106.8 |
| 13 | 78.9 | 110 |
| 14 | 81.2 | 113.5 |
| 15 | 83.2 | 116.5 |
| 16 | 85.5 | 118.8 |

*The thermally conductive bridging members were purchased from Dow Corning Corporation under the trade name of Silicone One Part RTV.

It is evident from the above table that, through the thermally conductive bridging members 4,7, the heat emanating from the stator windings 33 can be conducted to the first and second end walls 23,24 and the first and second thermally conductive rings 36 so as to facilitate dissipation of heat out of the accommodation chamber 210. Moreover, the thermally conductive bridging members 4,7 can prevent entrance of dust into the accommodation chamber 210 so as to ensure heat dissipation and operation of the motor assembly 100. Furthermore, by virtue of heat exchange conduits 37, the water pipes 91,93, and the communicating pipe 92 that constitute a water-cooling system, heat dissipation can be further enhanced. Thus, the motor assembly 100 can be made more compact in size.

Figure 4:
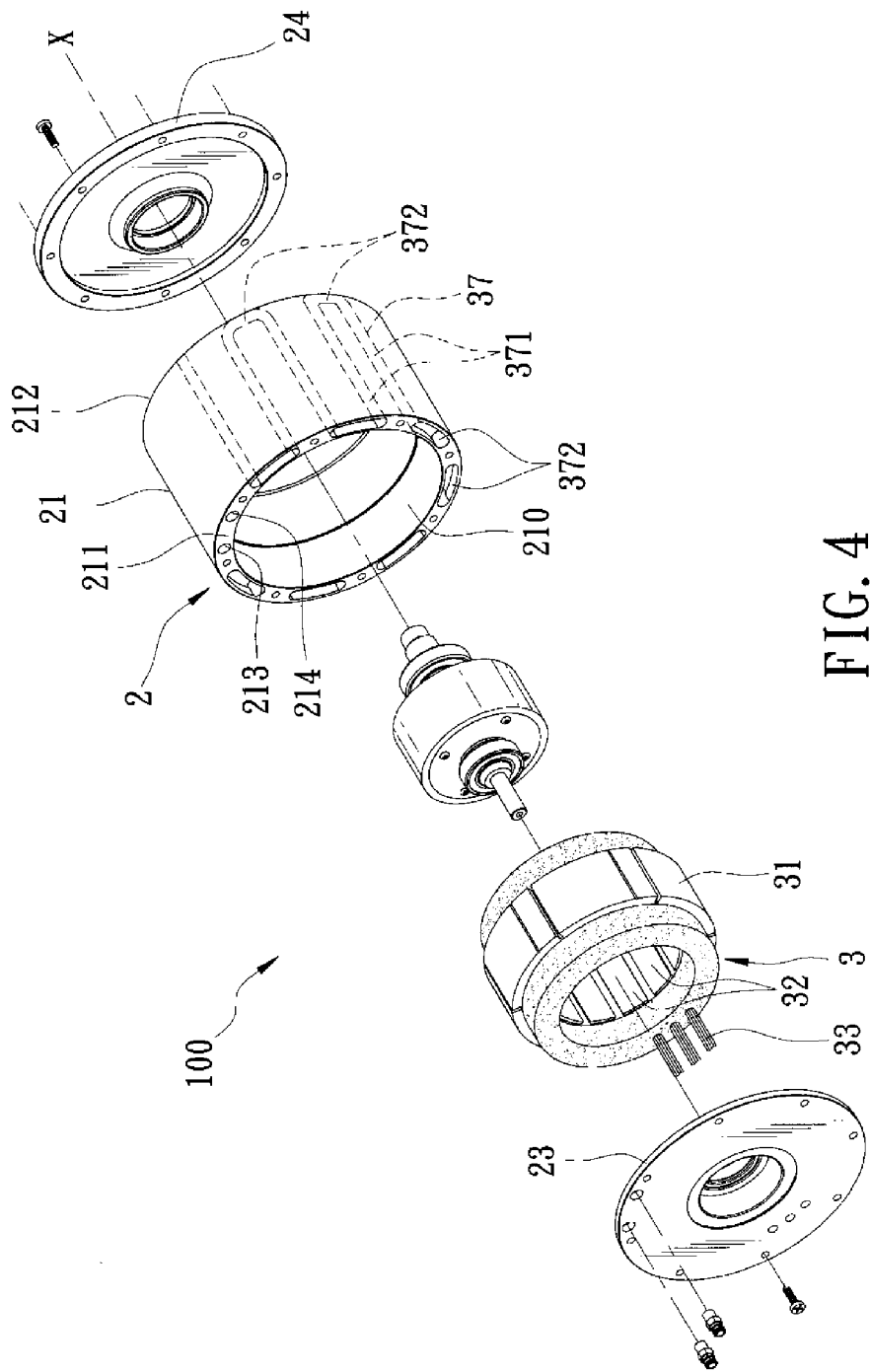
FIG. 4 is an exploded perspective view of the second preferred embodiment of a motor assembly according to this invention.
Figure 5:
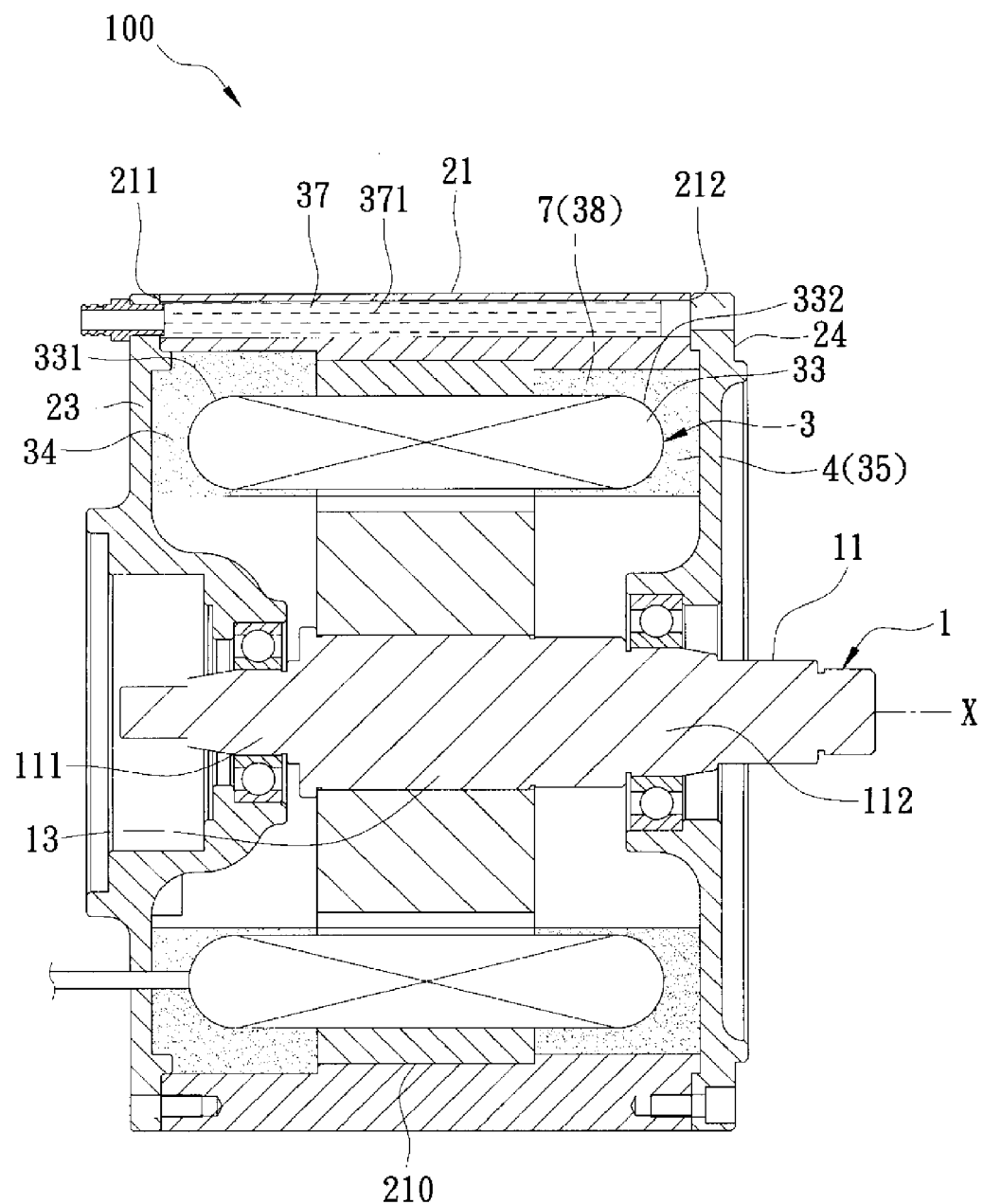
FIG. 5 is a sectional view of the second preferred embodiment.
Figure 6:
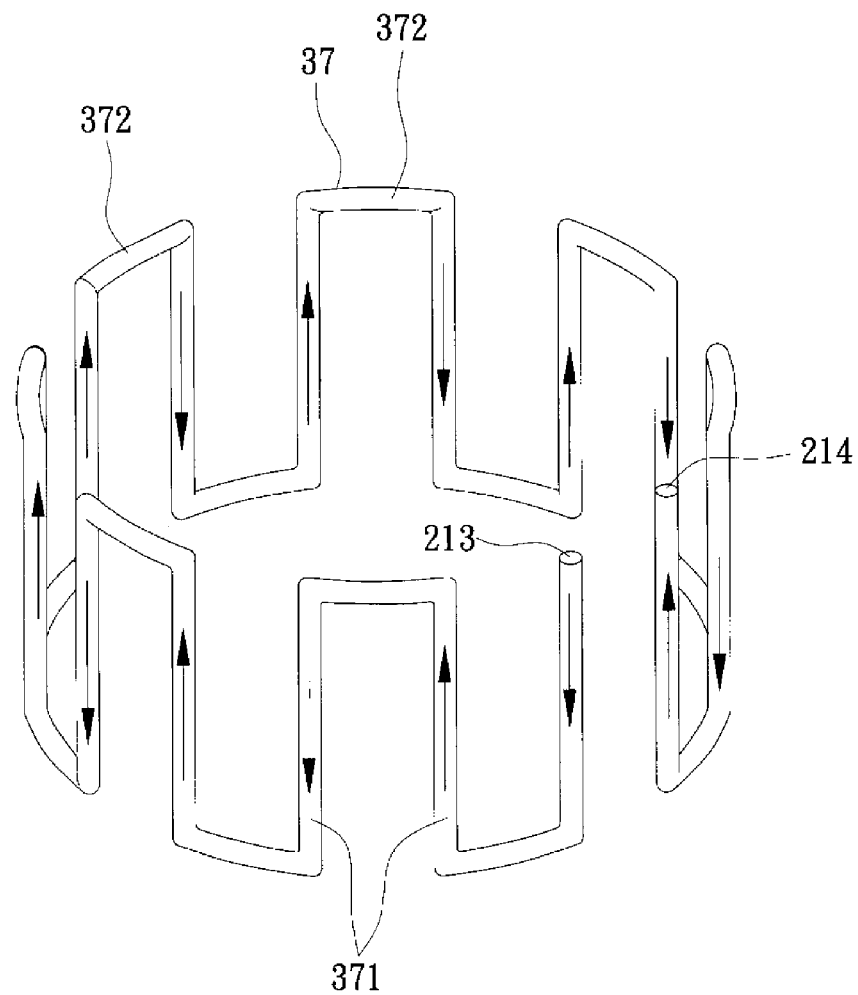
FIG. 6 is a perspective view of a heat exchange conduit of the second preferred embodiment.
Figure 7:
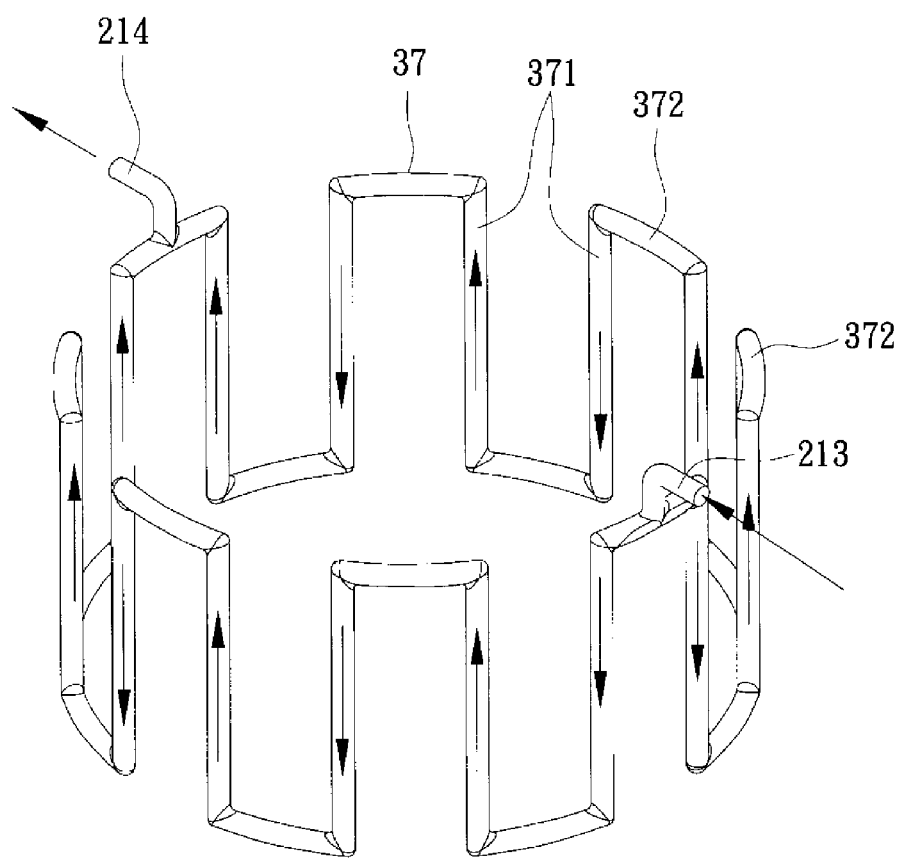
FIG. 7 is a perspective view of another form of the heat exchange conduit of the second preferred embodiment.

Referring to FIGS. 4 to 6, the second preferred embodiment of a motor assembly 100 according to this invention is shown to be similar to the previous embodiment, except that the heat exchange conduit 37 has a coolant inlet 213 and a coolant outlet 214 formed in one of the first and second peripheral edges 211,212, and a winding conduit which is formed in the housing wall 21 and which has a plurality of axially extending conduit segments 371 and circumferentially extending conduit segments 372 alternated with one another. In this embodiment, the circumferentially extending conduit segments 372 are formed in the first and second peripheral edges 211,212. It is noted that the circumferentially extending conduit segments 372 may be also formed in the first and second end walls 23,24. Alternatively, as shown in FIG. 7, the coolant inlet 213 and the coolant outlet 214 may be disposed diagonally to each other in terms of the axis (X).

Figure 8:
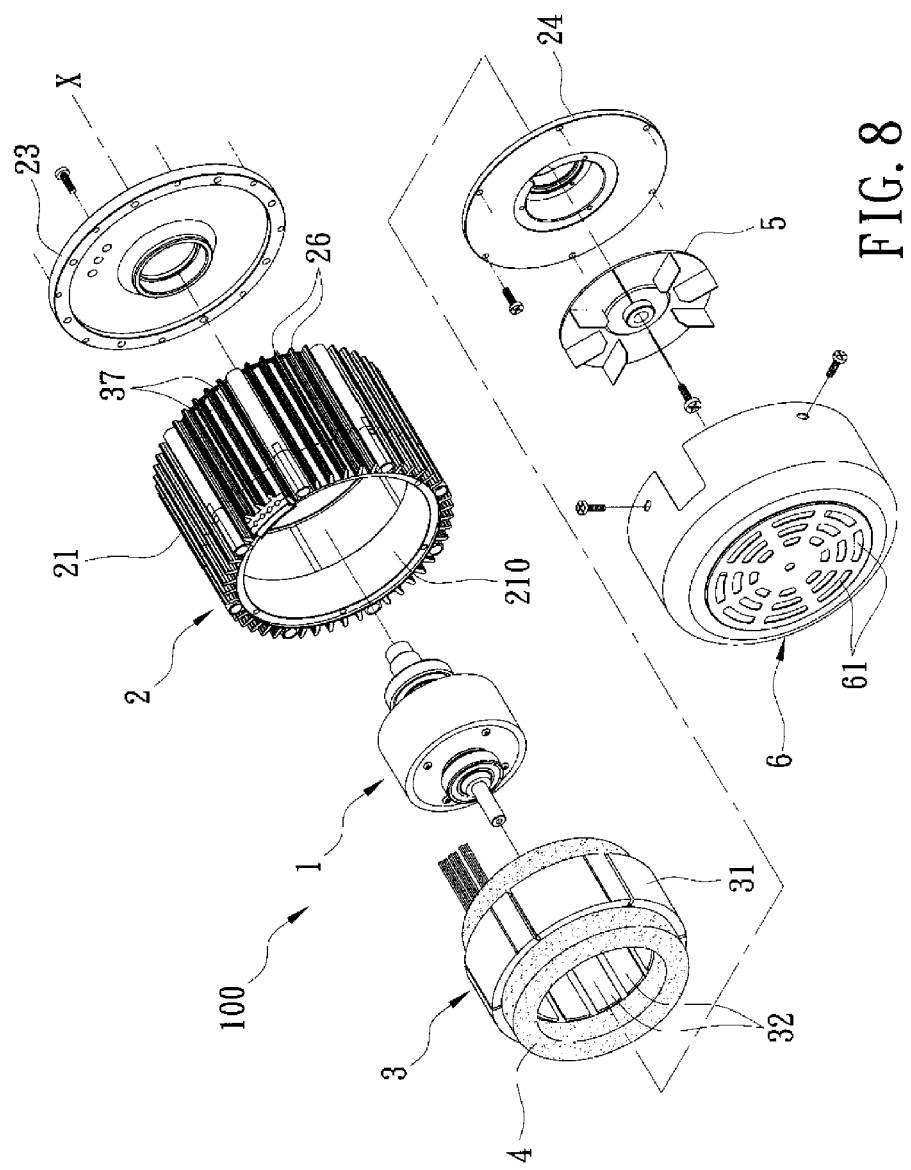
FIG. 8 is an exploded perspective view of the third preferred embodiment of a motor assembly according to this invention.
Figure 9:
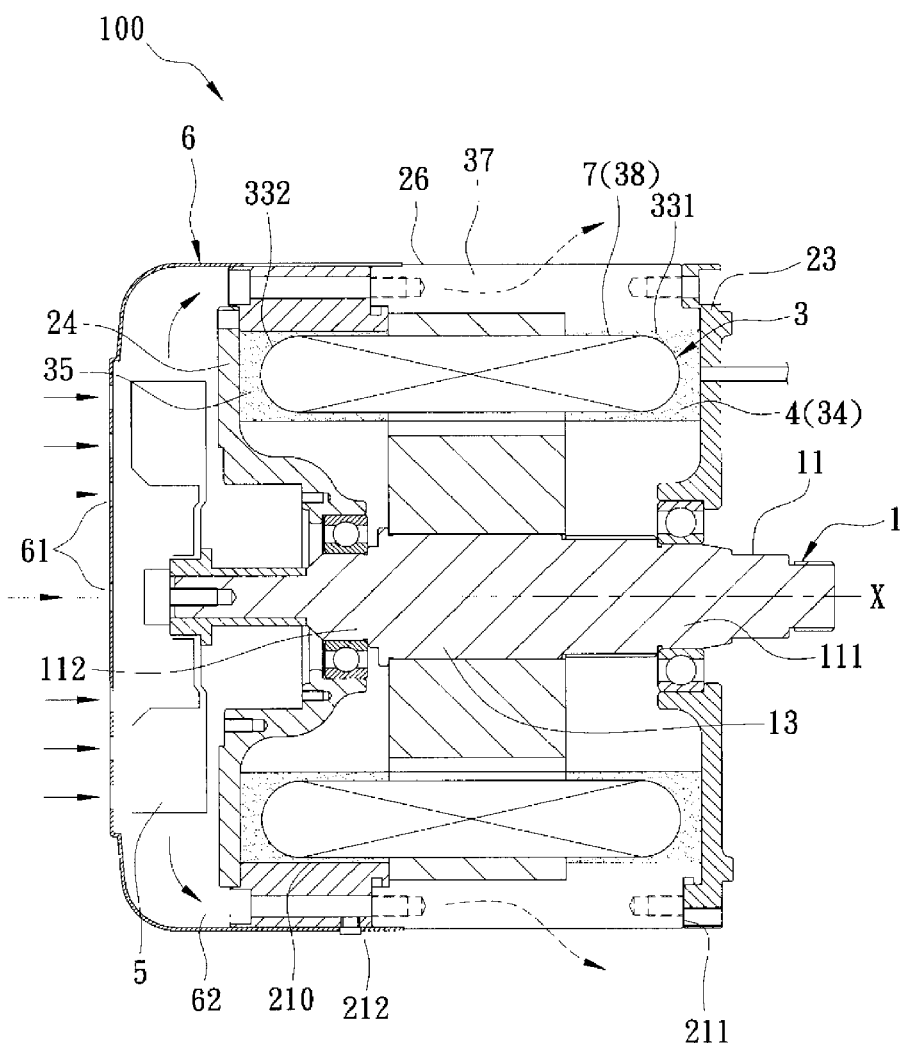
FIG. 9 is a sectional view of the third preferred embodiment.

Referring to FIGS. 8 and 9, the third preferred embodiment of a motor assembly 100 according to this invention is shown to be similar to the first embodiment, except that the motor assembly 100 further comprises an outer shell cap 6 and an impeller 5. The outer shell cap 6 is mounted on one of the first and second peripheral edges 211,212 of the housing wall 21, and is spaced apart from a corresponding one of the first and second end walls 23,24 to cooperatively define an impeller receiving space 62. The outer shell cap 6 has a plurality of air inlets 61. The impeller 5 is disposed in the impeller receiving space 62 and is mounted on a corresponding one of the first and second shaft ends 111,112 to be rotated therewith so as to introduce cool air into the impeller receiving space 62 from the air inlets 61. Further, the housing 2 has a plurality of heat dissipating fins 26 formed on the housing wall 21 and angularly spaced apart from one another about the axis (X). Thus, the heat in the accommodation chamber 210 is conducted to the housing wall 21 and is further taken out of the housing 2 by the cool air generated as a result of rotation of the impeller 5.

Figure 10:
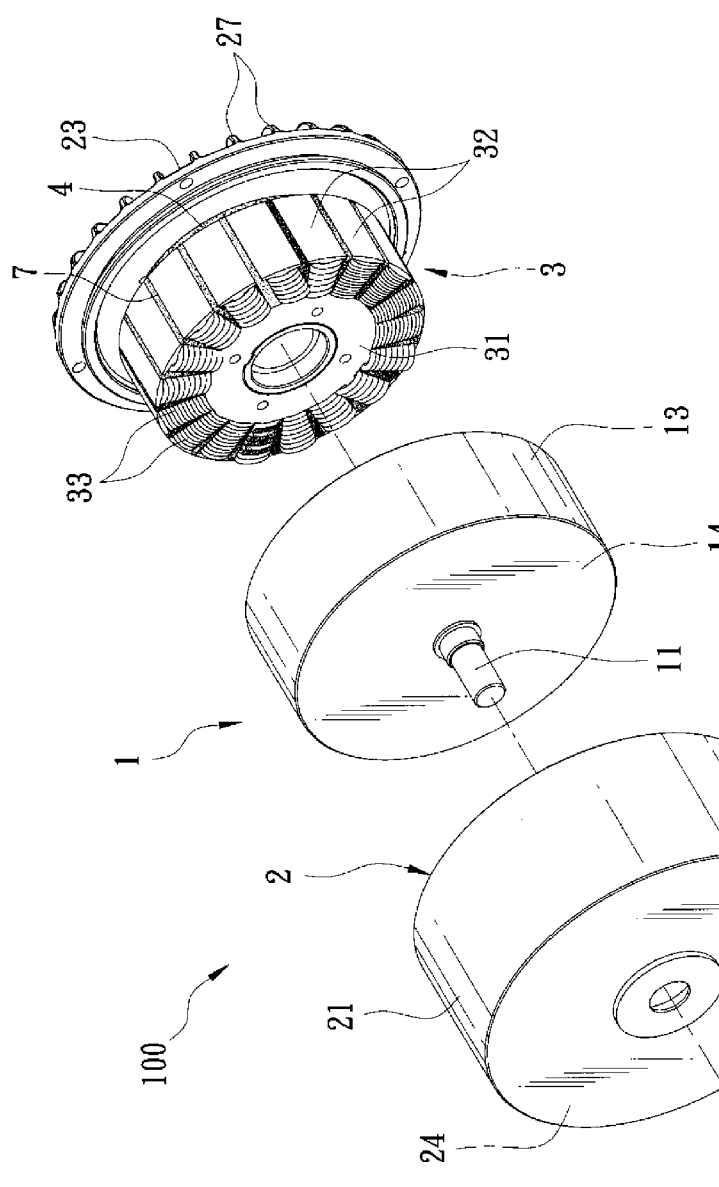
FIG. 10 is an exploded perspective view of the fourth preferred embodiment of a motor assembly according to this invention.
Figure 11:
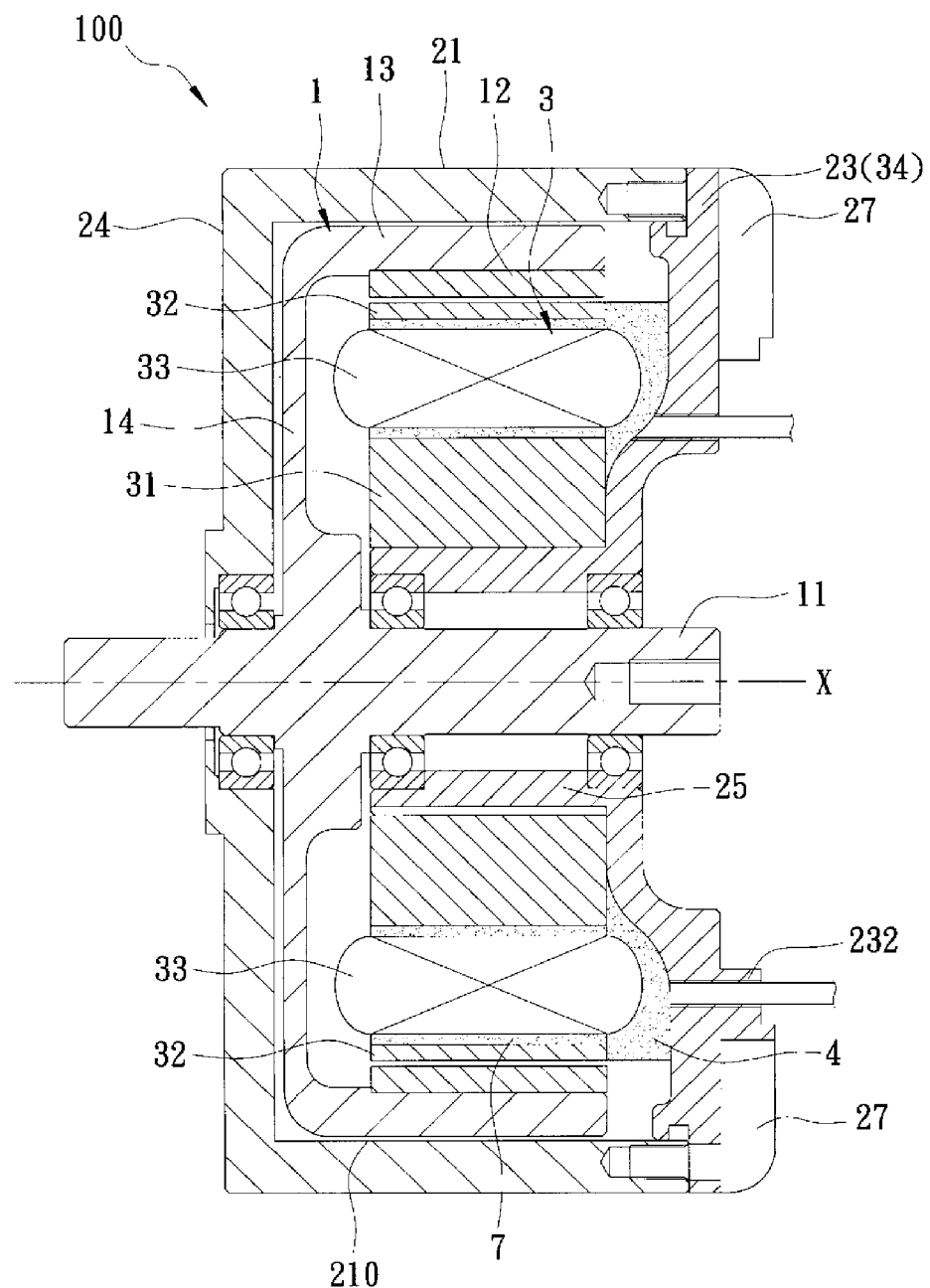
FIG. 11 is a sectional view of the fourth preferred embodiment.

Referring to FIGS. 10 and 11, the fourth preferred embodiment of a motor assembly 100 according to this invention is an "outer-rotor-type" brushless motor, and is shown to be similar to the first embodiment. In this embodiment, the rotor subassembly 1 further includes a supporting carrier portion 14 which extends radially and outwardly from the revolving shaft 11 to support the magnet mounting portion 13 to surround the magnetically inducible core 31. The housing 2 includes a hub wall 25 integrally formed with the first end wall 23 and configured to permit the revolving shaft 11 to revolve relative thereto. The magnetically inducible core 31 is secured to the hub wall 25. The primary thermally conductive bridging member 4 is disposed to span the first axial intervals 34 between the stator windings 33 and the first end wall 23. Further, the housing 2 has a plurality of heat dissipating fins 27 formed on the first end wall 23.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A motor assembly comprising:
    a housing having a housing wall which defines an accommodation chamber therein, and which extend in an axial direction to terminate at first and second peripheral edges, and first and second end walls extending radially from said first and second peripheral edges, respectively, toward an axis, so as to close said accommodation chamber;
    a rotor subassembly including
        a revolving shaft having first and second shaft ends which are supported on said first and second end walls, respectively, to permit said revolving shaft to be revolvable about the axis,
        a magnet mounting portion which is disposed in said accommodation chamber, which surrounds and which is rotatable with said revolving shaft about the axis, and
        a magnet which is disposed on said magnet mounting portion, and which has a plurality of rotor magnetic poles that are oriented radially;
    a stator subassembly including
        a magnetically inducible core disposed in said accommodation chamber, and having a plurality of stator poles which are angularly displaced from one another about the axis, and each of which confronts and is spaced apart from a corresponding one of said rotor magnetic poles in a radial direction relative to the axis, and
        a plurality of stator windings wound on said stator poles, respectively, such that, when said stator windings are fed with electricity, said magnet mounting portion is induced to rotate together with said revolving shaft about the axis, each of said stator windings having first and second end-wall-side regions which are respectively spaced apart from said first and second end walls by first and second axial intervals, respectively; and
    a primary thermally conductive bridging member disposed to span at least one of said first and second axial intervals to conduct heat emanating from a corresponding one of said stator windings to a corresponding one of said first and second end walls so as to dissipate heat out of said accommodation chamber.

2. The motor assembly according to claim 1, wherein said stator poles are angularly spaced apart from one another by a plurality of radially extending gaps, said motor assembly further comprising a secondary thermally conductive bridging member which is disposed to span each of said radially extending gaps, and which extends in the axial direction to be integrally formed with said primary thermally conductive bridging member.

3. The motor assembly according to claim 2, wherein said primary and secondary thermally conductive bridging members are made from a thermally conductive resin-based composite.

4. The motor assembly according to claim 3, wherein said magnet mounting portion is integrally formed with said revolving shaft between said first and second shaft ends, said magnet being configured to surround said magnet mounting portion and being disposed inwardly and radially of said magnetically inducible core.

5. The motor assembly according to claim 4, further comprising a heat exchange conduit disposed in said housing wall to permit a coolant to pass therethrough so as to remove the heat from said accommodation chamber and exteriorly of said housing.

6. The motor assembly according to claim 5, wherein said stator subassembly includes first and second thermally conductive rings disposed between said stator windings and said housing wall, each of said first and second thermally conductive rings having an outer concaved surface facing said housing wall to cooperatively define said heat exchange conduit, said housing wall having a coolant inlet and a coolant outlet in fluid communication with said heat exchange conduit for permitting a coolant to flow into said heat exchange conduit from said coolant inlet and out through said coolant outlet.

7. The motor assembly according to claim 5, wherein said heat exchange conduit has a coolant inlet and a coolant outlet which are formed in one of said first and second peripheral edges, and a winding conduit which is formed in said housing wall and which has a plurality of axially extending conduit segments and circumferentially extending conduit segments alternate with one another.

8. The motor assembly according to claim 5, further comprising:
    an outer shell cap which is mounted on one of said first and second peripheral edges and which is spaced apart from a corresponding one of said first and second end walls to cooperatively define an impeller receiving space, said outer shell cap having a plurality of air inlets; and
    an impeller which is disposed in said impeller receiving space and which is mounted on a corresponding one of said first and second shaft ends to be rotated therewith so as to introduce cool air into said impeller receiving space from said air inlets.

9. The motor assembly according to claim 8, wherein said housing has a plurality of heat dissipating fins disposed on said housing wall and angularly spaced apart from one another about the axis.

10. The motor assembly according to claim 3, wherein said housing further includes a supporting carrier portion which extends radially and outwardly from said revolving shaft to support said magnet mounting portion to surround said magnetically inducible core, said stator subassembly including a hub wall configured to permit said revolving shaft to revolve relative thereto, said magnetically inducible core being secured to said hub wall.

11. The motor assembly according to claim 3, wherein said primary and secondary thermally conductive bridging members are made by a process which comprises the steps of (i) filling said first and second axial intervals and said radial extending gaps with a thermally conductive resin-based composition which comprises a polymeric resin matrix and a thermally conductive material that is loaded in said polymeric resin matrix and that is selected from a group consisting of silicon carbide, aluminum, boron nitride, aluminum nitride, and the mixture thereof, and (ii) curing said thermally conductive resin based composition.

* * * * *